United States Patent [19]

Winslow

[11] 4,357,533
[45] Nov. 2, 1982

[54] FOCUS DETECTOR FOR AN OPTICAL DISC PLAYBACK SYSTEM

[75] Inventor: John S. Winslow, Altadena, Calif.

[73] Assignee: Discovision Associates, Costa Mesa, Calif.

[21] Appl. No.: 168,812

[22] Filed: Jul. 14, 1980

[51] Int. Cl.³ .............................................. G01J 1/36
[52] U.S. Cl. ...................................... 250/204; 369/45
[58] Field of Search ........... 250/201, 204, 209, 237 R; 356/4; 354/25; 369/45

[56] References Cited

U.S. PATENT DOCUMENTS

| | | | |
|---|---|---|---|
| 3,454,772 | 7/1969 | Vitt et al. | 250/204 |
| 3,967,110 | 6/1976 | Rogers et al. | 250/201 |
| 3,975,631 | 8/1976 | Takeda | 354/25 |
| 4,203,031 | 5/1980 | Kamachi et al. | 250/201 |

Primary Examiner—David C. Nelms
Attorney, Agent, or Firm—Ronald J. Clark

[57] ABSTRACT

Electro-optical focus detection apparatus for providing a signal indicative of the magnitude and polarity of focus error in a light beam impinging on a surface, such as a recording surface in a recording or playback system. The detector includes a beam splitter for dividing the beam reflected from the recording surface into two reflected beams of equal power, and includes an aperture placed in the path of the two reflected beams. The first reflected beam converges at a focal point before encountering the aperture and the second reflected beam converges at a focal point after encountering the aperture, both beams thereafter impinging upon separate photodetector elements. The aperture reduces the light incident on the photodetectors from both reflected beams, and the apparatus is so configured that the powers of the reflected beams incident on the photodetector elements are identical when the original beam is in focus on the recording surface. When the original beam moves out of focus with the recording surface, both focal points of the reflected beams move in the same direction, to provide an increase in the light falling on one of the photodetector elements and a decrease in light falling on the other, such that the differential output derived from the photodetector elements provides a signal indicative of the magnitude and polarity of the focus error.

6 Claims, 4 Drawing Figures

1

FOCUS DETECTOR FOR AN OPTICAL DISC PLAYBACK SYSTEM

BACKGROUND OF THE INVENTION

This invention relates generally to optical focus detectors and, more particularly, to electrooptical detectors for providing an indication of the focus error with respect to a radiant energy beam impinging on a surface. Such focus detectors are useful in a variety of applications, but are particularly well suited for use in automatic focus control systems, such as might be used in recording or playback apparatus in which information is recorded on, or played back from a recording surface by means of a beam of light or other radiant energy.

By way of a more specific example, one type of disc recording system, used for recording video or other information, records information on a disc surface by means of a laser beam focused onto the recording surface by an objective lens, the intensity of the beam being modulated in some manner to produce corresponding changes in an optical condition of the surface. During playback of the recording, a laser reading beam is also employed and is focused on the recording surface as the disc is rotated. A reflected portion of the reading beam is then directed to a photodetector device, which provides an electrical signal from which the recorded information can be reproduced. In both the recording and playback modes of operation, accurate control of the focus of the beams is critical to successful operation of the apparatus.

Focus detectors of the prior art have utilized a central disc and concentric photodetector elements to measure the focus error of a beam. However, such devices do not exhibit the precision and linearity needed for some applications. Accordingly, there is still a significant need for a precise focus detector capable of measuring both the magnitude and direction of focus error. Ideally, such a detector should have a substantially linear response characteristic for some distance on both sides of the point of zero focus error, i.e., the output signal generated by the detector should be practically proportional to the focus error, which can be measured as a distance of displacement of the objective lens. The present invention satisfies this need.

SUMMARY OF THE INVENTION

The present invention resides in an electrooptical focus detector providing an electrical output that varies linearly with the focus error for a substantial distance on each side of the point of zero focal error. Moreover, the detector of the invention has a null or in-focus condition that is insensitive to cyclic variations in beam intensity, such as would typically be encountered in recording systems. Basically, and in general terms, the apparatus of the invention comprises beam splitting means for dividing the reading beam reflected from the recording surface into two reflected beams of equal power, one of the two beams converging at a first focal point and the other at a second focal point, and aperture means disposed in the path of two beams, such that the first and second reflected beams are on opposite sides of the aperture means, and such that, only when the original beam is exactly in focus, the two beams have equal powers after passing through the aperture means. Finally, the apparatus includes detection means disposed in the path of the apertured beams and having two detector elements disposed in the respective paths of the beams.

The detection means also includes, in the presently preferred embodiment of the invention, differential amplifier means coupled to the detector elements to provide a signal indicative of the difference between the total light power levels falling on the two elements. When the original beam is perfectly in focus, the aperture means passes two beams of equal power, and the two detector elements, which are preferably segments of a split photodiode device, produce equal electrical outputs, which cancel in the differential amplifier means. When the recording surface and the original beam move out-of-focus condition by a given amount, both the first and second focal points are displaced in the same direction, allowing more light from one of the reflected beams to pass through the aperture means and less light from the other. Accordingly, the two detector elements, or split photodiode segments, produce higher and lower outputs, respectively, and the output of the differential amplifier is increased. If the focus condition changes by the same amount in the opposite direction, the same effect will occur but the detector elements will be oppositely affected, and the output of the differential amplifier means will have the same magnitude but opposite polarity.

In the presently preferred embodiment of the invention, the aperture means includes a plate having a single aperture through which both reflected beams are directed. Alternatively, the beam splitting means can be arranged to produce two beams directed through two separate apertures and thence to two separate photodiodes, the outputs of which are electrically connected, as before, to the differential amplifier means.

The outputs of the two diodes can also be summed to provide an output proportional to beam intensity, from which information recorded on the disc can be reproduced.

It will be appreciated from the foregoing that the invention represents a significant advance in the field of optical focus detectors suited for use in focus control systems. The device of the invention has a longer linear range about the point of focus and a more symmetrical characteristic than the prior art disc and anulus detectors, because of the symmetry between the two beams. When the recording surface is out of focus by a given distance, the magnitude of the differential output will tend to be proportional to this distance, while the polarity will depend on the position of the recording surface with respect to the focal point of the reading beam. Other aspects and advantages of the invention will become apparent from the following more detailed description, taken in conjunction with the accompanying drawings.

DESCRIPTION OF THE PREFERRED EMBODIMENT

Figure 1:
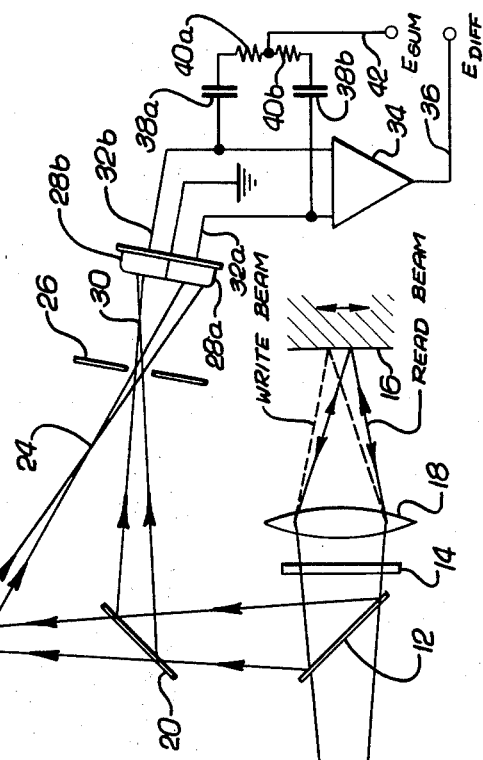
FIG. 1 is a schematic view showing a combination of optical and electrical components configured in accordance with the present invention.

As shown in the drawings for purposes of illustration, the present invention is concerned with a focus detector. More particularly the invention relates to a focus detector particularly well suited for use in recording and playback machines in which a radiant energy beam, such as a light beam from a laser or other source, is directed onto a recording surface, either to record information on or to reproduce information from the surface.

In accordance with the invention, a beam reflected from the recording surface is split into two equal portions which are focused and apertured in such a manner that equal amounts of radiant power in the two portions of the beam will impinge upon respective detector elements only when the original beam is exactly focused on the recording surface. Whenever there is relative movement away from the in-focus condition, more light falls on one detector element than the other, and a differential output signal is produced indicative of both the magnitude and polarity of the focus error.

More specifically, in the illustrative embodiment of the invention, a collimated, linearly polarized laser light beam is incident on a condensing lens, indicated by reference numeral 10, and then passes through a polarizing beam splitter 12 and a quarter-wave plate 14. The beam is circularly polarized by the quarter wave plate 14 and is then focused onto a recording surface 16 by means of an objective lens 18. After reflection from the recording surface 16, with its sense of circular polarization reversed, the beam returns through the objective lens 18 to the quarter-wave plate 14, where it is linearly polarized in a plane orthogonal to the polarization plane of the original beam incident upon the beam splitter 12.

The beam emerging from the quarter-wave plate 14 is now reflected by the beam splitter 12 to a conventional beam splitter 20, which reflects half of the light beam and transmits the other half through to a mirror 22. The beam portion transmitted to the mirror 22 is reflected therefrom and converges to a first focal point 24. An aperture 26 is disposed in the path of this reflected beam at a location beyond the focal point 24, and, as will shortly be appreciated, the aperture limits the amount of light in the beam and passes a portion of it to one segment 28a of a split diode detector.

The portion of the beam reflected at beam splitter 20 converges to a second focal point 30, after passing through the same aperture 26. The spacings and dimensions of the components are such that the aperture 26 operates to limit the amount of light in this second beam portion which, after convergence at the focal point 30, impinges on the other segment 28b of the split photodiode.

The optical elements of the system described are so aligned and positioned that, when the original beam is exactly in focus on the recording surface 16, equal powers or intensities of light are passed through the aperture with respect to each of the two beam portions. Consequently, equal light powers are incident upon the two segments 28a and 28b of the split photodiode detector, and equal electrical signals are generated on output lines 32a and 32b therefrom. These lines are connected as inputs to a differential amplifier 34, the output of which, on line 36, indicates the magnitude and polarity of the focus error.

Lines 32a and 32b are also connected to capacitors 38a and 38b, respectively, the other terminals of which are connected to opposite ends of a resistor having two series-connected portions 40a and 40b. A sum signal is derived from the junction of the resistors, as shown at 42.

Figure 2:
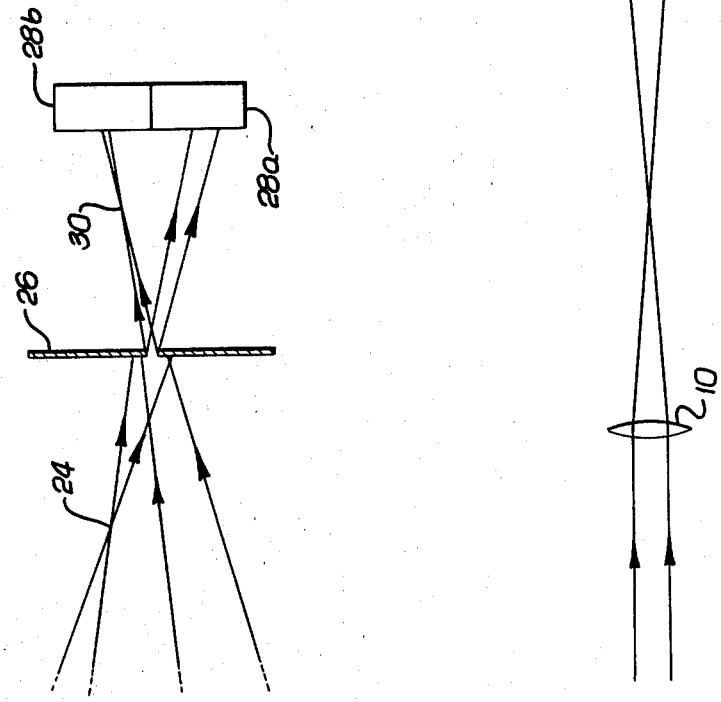
FIG. 2 is a fragmentary view of a portion of FIG. 1, showing in more detail the relationship between two split reflected beams and an aperture.

As shown in FIG. 2, the aperture 26 is operative to decrease the amount of light in each of the reflected beam portions. When the recording surface 16 and the objective lens 18 move relative to each other in such a manner that there is a movement away from the in-focus position, both focal points 24 and 30 move in the same direction. Accordingly, it will be seen that if, for example, the focal points move towards the photodiode segments 28a and 28b, the aperture 26 will be effective to decrease the amount of light in the beam portion converging at point 30, and to increase the amount of light in the beam portion converging at point 24. Thus, photodiode segment 28b will produce a larger output than photodiode segment 28a, and a corresponding differential output on line 36 from the differential amplifier 34 will result. Conversely, if the focal points 24 and 30 move away from the photodiode segments 28a and 28b, the amount of light falling on segment 28a will increase and that falling on 28b will decrease, resulting in a differential output signal on line 34 of different polarity.

Figure 3:
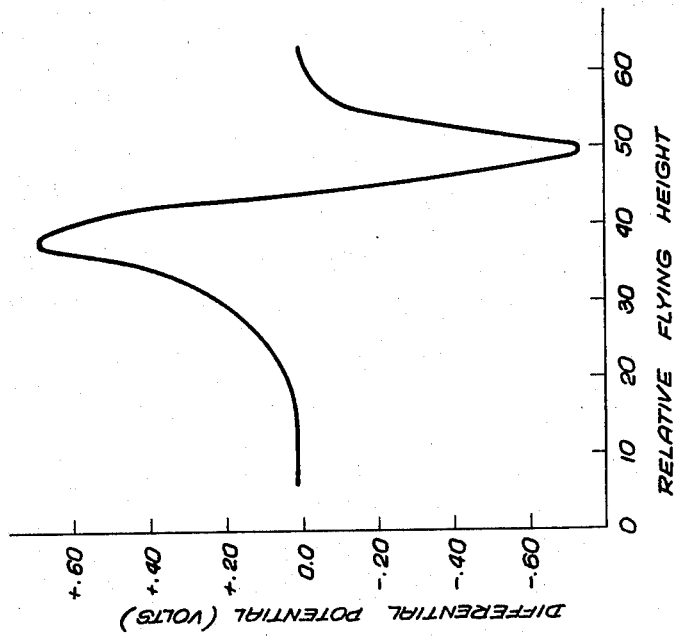
FIG. 3 is a graph showing the relationship between the electrical output of the detector shown in FIG. 1 and the relative focal distance between an objective lens and a surface.

The complete output characteristic is shown in FIG. 3, from which it will be seen that the characteristic is substantially linear for some distance on each side of the in-focus position, which corresponds to a position of zero electrical output. It will also be apparent from the characteristic that, if the error in focus is relatively large, both focal points will be displaced to the same side of the aperture 26, after which any further movement will result in a decrease in the output from the photodiode segment whose output was, until then, increasing. Consequently, the response characteristic will eventually fall to zero again for large focus errors, as indicated by the extreme portions of the characteristic. Naturally, it is desirable to operate the focus detector in the central linear region of its characteristic.

Since the response of the device is dependent upon a differential mode of operation, power fluctuations in the laser beam do not change the position of the focus null. The range of the device, which is defined as the change in distance of the objective lens system with respect to the recording surface between maximum and minimum output voltages from the device, is dependent principally upon the aperture size. Increasing the aperture diameter results in a narrower range, while decreasing the aperture diameter increases the range. In one experiment, it was found that a 0.25 millimeter diameter aperture yields a nine-micron range. In this configuration, the slope in the region of interest is substantially linear, and focus changes of the order of 0.1 micron are easily detected. The sensitivity of the device, as reflected by the slope of the characteristic, is dependent upon such factors as laser power and disc reflectivity. The range of the device, however, is independent of these variables.

It will be appreciated that extreme care must be taken to align the various optical elements properly to achieve the characteristics shown. The first step in alignment is to ensure that the diode sensing elements lie in the plane of the optical path such that the two incoming beams fall within the two light sensitive detection areas. Then the quarter-wave plate is rotated to achieve maximum power at the aperture and the first beam is centered on the aperture by adjusting the mirror 22 to produce maximum power on the diode portion 28a. Next the second beam is centered on the aperture by adjusting the beam splitter 20. Then the gain of the amplifier 34 is adjusted so that minimum and maximum deflections are equidistant from the null point of the amplifier. The assembly of the entire apparatus is then adjusted until the device indicates zero output when the original beam is exactly in focus on the recording surface.

As shown by the beam indicated in broken lines in FIG. 1, the lens 18 may also be used to focus a write beam onto the surface 16, as is the case in some recording systems. The read beam, shown in solid lines, is then focused slightly "behind" the write beam with respect to the direction of motion of the surface 16, and reads back the recorded information signal.

Figure 4:
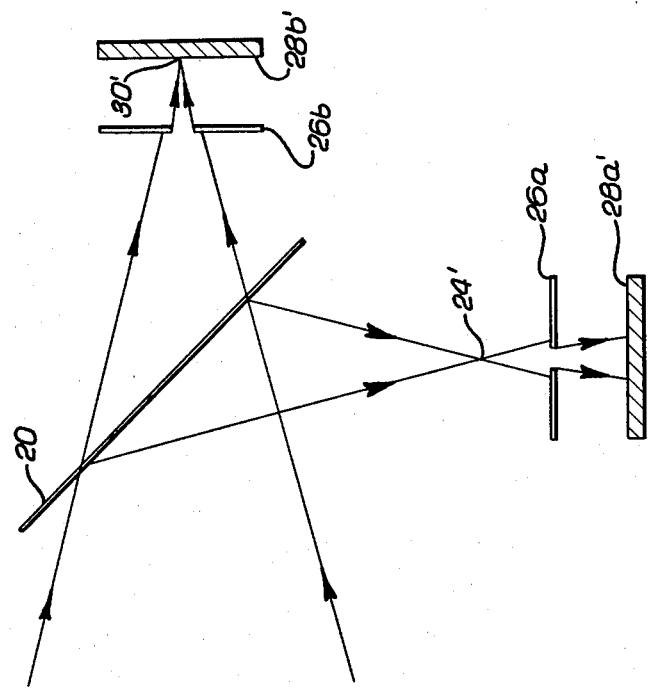
FIG. 4 is a fragmentary view of an alternate arrangement of apertures and photodiodes in accordance with the invention.

As indicated in FIG. 4, separate apertures 26a and 26b may be used rather than the single aperture shown in FIG. 1. The mirror 22 in FIG. 1 need not, of course, be used in this configuration, since the apertures 26a and 26b are positioned in the respective beam portions derived from the beam splitter 20. Separate photodiodes 28a' and 28b' are utilized in this configuration, but they are electrically connected in the same way as the split photodiode of FIG. 1, and the output characteristic of the device is also substantially the same.

It will be appreciated from the foregoing that the present invention represents a significant advance in the field of focus detectors, especially as these are employed in relation to recording devices using focused radiant energy beams for recording, playback, or both. In particular, the device of the invention provides a precise and substantially linear measure of focus error, in such a manner that it may be easily adapted for use with focus control systems. It will also be appreciated that, although a specific embodiment of the invention has been described in detail for purposes of illustration, various modifications may be made without departing from the spirit and scope of the invention. Accordingly, the invention is not to be limited except as by the appended claims.

I claim:

1. An optical disc playback system for reading optically encoded information recorded in an information track on the reflective information plane of the optical disc, including an automatic imaging servo system comprising:

a laser light source for producing a linearly polarized, incident reading beam of light radiation;

an optical beam directing system for directing said incident beam from said laser source along a beam path to the information track, the incident beam being modulated and reflected by the information track to retrace at least a portion of the path of said incident beam; said optical beam directing system including:

a polarizing beam splitting prism aligned with said direction of polarization of said incident beam;

a quarter wave plate disposed between said prism and the disc for changing said linearly polarized beam into a circularly polarized incident beam;

said circularly polarized incident beam having its sense of circular polarization reversed by impact upon and reflection from the information track;

said quarter wave plate linearly polarizes said reflected beam in a plane orthogonal to said polarization plane of said incident beam;

said polarizing beam splitting prism reflects the reflected beam out of the incident beam path;

beam splitting means disposed in the path of said last reflected beam for producing first and second beams of approximately equal power;

a mirror disposed in the path of said first beam to increase its path length;

a single aperture disposed in the path of said first and second beams such that, when the original beam is imaged on the information track, said first reflected beam converges to a first focal point prior to passing through said aperture and the second reflected beam converges to a second focal point after passing through said aperture, and such that the total power of said first beam after passing through said aperture means is substantially the same as the total power of the second beam after passing through said aperture;

photodiode detection means having first and second segments disposed in the paths of said first and second reflected beams respectively after passing through said aperture for producing electrical signals proportional to the power of each of said first and second beams; and subtraction means for producing a signal proportional to the difference between the powers of said first and second beams for indicating the magnitude and polarity of the imaging error of said incident beam.

2. Apparatus as set forth in claim 1, and further including:

summing means for producing a signal proportional to the sum of the powers of the first and second reflected beams, and therefore proportional to the intensity of radiant energy reflected from the surface.

3. An optical disc playback system for reading optically encoded information recorded in an information track on the reflective information plane of the optical disc, including an automatic imaging servo system comprising:

a laser light source for producing a linearly polarized, incident reading beam of light radiation;

an optical beam directing system for directing said incident beam from said laser source along a beam path to the information track, the incident beam being modulated and reflected by the information track to retrace at least a portion of the path of said incident beam; said optical beam directing system including:

a polarizing beam splitting prism aligned with said direction of polarization of said incident beam;

a quarter wave plate disposed between said prism and the disc for changing said linearly polarized beam into a circularly polarized incident beam;

said circularly polarized incident beam having its sense of circular polarization reversed by impact upon and reflection from the information track;

said quarter wave plate linearly polarizes said reflected beam in a plane orthogonal to said polarization plane of said incident beam;

said polarizing beam splitting prism reflects the reflected beam out of the incident beam path;

beam splitting means disposed in the path of said last reflected beam for producing first and second beams of approximately equal power;

a mirror disposed in the path of said first beam to increase its path length;

a single aperture disposed in the path of said first and second beams such that, when the original beam is imaged on the information track, said first reflected beam converges to a first focal point prior to passing through said aperture and the second reflected beam converges to a second focal point after passing through said aperture, and such that the difference between the power of the first beam passed by said aperture and the power of the second beam passed by said aperture is equal to a predetermined value; and detection means disposed in the path of said first and second beams after passing through said aperture, and providing a signal indicative of the difference between the powers of the first and second beams for indicating the imaging error of the incident beam with respect to the information track.

4. Apparatus as set forth in claim 3, wherein said detection means further includes:

summing means to provide a signal proportional to the sum of the powers of the first and second beams, to be used in the reproduction of information recorded on the surface.

5. Apparatus as set forth in claim 3, wherein the predetermined difference value is zero, and the signal obtained from the detection means is substantially proportional to the magnitude and polarity of the focus error.

6. Apparatus as set forth in claim 3, wherein said detection means includes a split photodiode and a differential amplifier.

* * * * *